United States Patent [19]

Adams

[11] 4,138,341
[45] Feb. 6, 1979

[54] ADJUSTABLE SUPPORT ATTACHMENT FOR STRAINER HANDLES

[76] Inventor: Richard M. Adams, 1321 S. Eliseo Dr., Greenbrae, Calif. 94904

[21] Appl. No.: 864,391

[22] Filed: Dec. 27, 1977

[51] Int. Cl.² .............................................. B01D 35/28
[52] U.S. Cl. ..................................... 210/470; 248/94
[58] Field of Search ................. 248/94; 210/470, 473, 210/474

[56] References Cited

U.S. PATENT DOCUMENTS

| | | | |
|---|---|---|---|
| 900,221 | 10/1908 | Smith | 248/94 |
| 965,737 | 7/1910 | Parrish | 248/94 |
| 2,783,010 | 2/1957 | Ferguson | 248/94 |
| 2,836,300 | 5/1958 | Serr | 210/474 X |
| 2,905,418 | 9/1959 | Escartin | 248/94 |

Primary Examiner—William A. Cuchlinski, Jr.
Attorney, Agent, or Firm—Owen, Wickersham & Erickson

[57] ABSTRACT

A kitchen utensil for attachment to the handle of strainers to enable their partial support by a table surface. The device includes mechanism for attachment by sliding action to the ordinary handle of the strainer and a pivoted support rod, which can be swung down from a position substantially parallel to the strainer handle to one substantially perpendicular to it, or any intermediate angle thereby to enable the utensil to be supported by the table, as well as by the container in which the strainer rests.

3 Claims, 5 Drawing Figures

U.S. Patent    Feb. 6, 1979    4,138,341
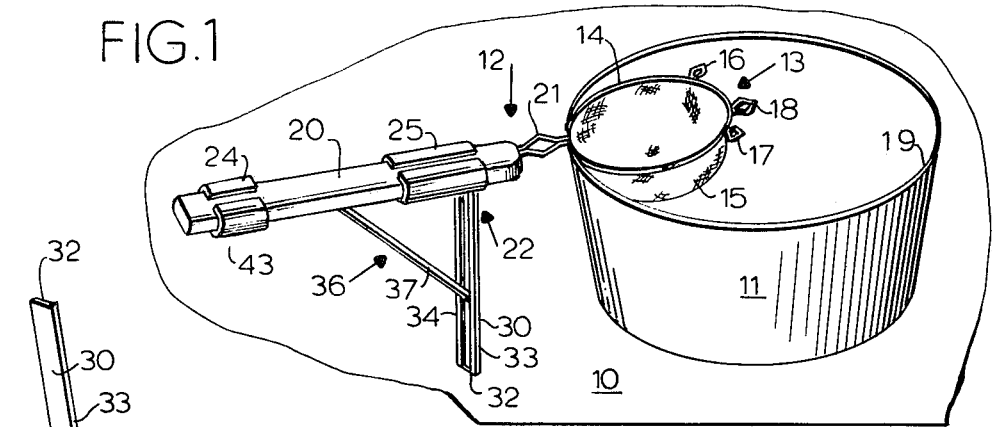
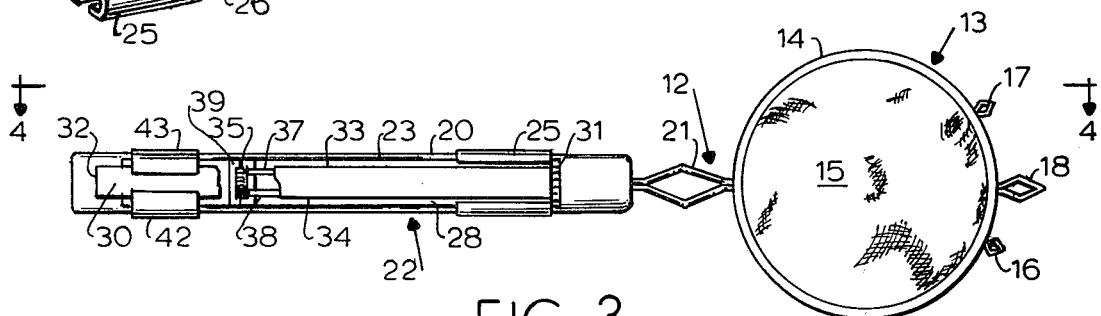
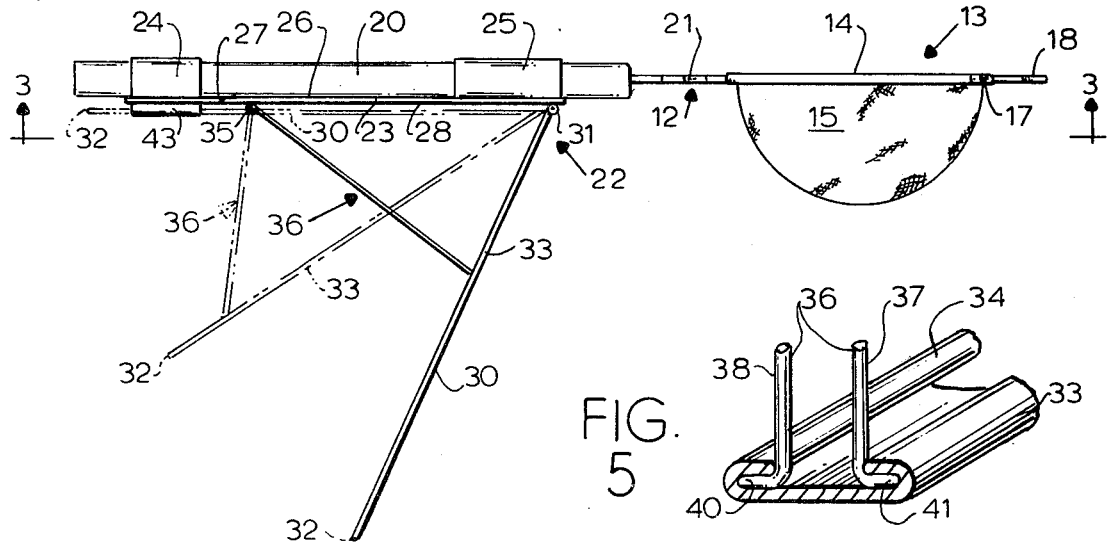

ADJUSTABLE SUPPORT ATTACHMENT FOR STRAINER HANDLES

BACKGROUND OF THE INVENTION

Kitchen strainers typically have handles that weigh more than the strainer itself, so that when they are placed in a tea cup, mixing bowl, or other utensil, they tend to fall out unless held up by one hand.

The present invention solves the problem of support, enabling the cook to have both hands free.

An object of the invention, therefore, is to provide a utensil which can be attached to strainer handles so that the strainer may be used in either the normal manner or in a self-supporting manner in a bowl or cup on a counter or table surface.

SUMMARY OF THE INVENTION

The invention comprises a support device having a suitable attachment means, such as a metal clip, for attaching it to the handle of a strainer. This may be at least one metal clip which slides over the handle, and slides along it, and becomes substantially attached to it. A support rod, preferably of channel design is provided, and it is pivoted by a hinge to the clip. A tension arm for the support rod is included, and also there is a metal clip which also slides over the handle and is used to lock the support rod in its normal position parallel to the handle. The support rod can be unlocked and removed from the clip, and swung down and engaged with the table surface.

Other objects and advantages of the invention will appear from the following description of a preferred embodiment.

BRIEF DESCRIPTION OF THE DRAWINGS

In the drawings:

FIG. 1 is a view in perspective showing a portion of a counter with a strainer embodying the principles of the invention resting in a mixing bowl. The strainer's handle has a support attachment secured to it according to the principles of the invention, the support attachment resting on the counter so that it and the mixing bowl so support the strainer that it will not fall out of the mixing bowl.

FIG. 2 is an enlarged fragmentary view inperspective of the support attachment for the handle of the strainer of FIG. 1.

FIG. 3 is an enlarged bottom view of the strainer of FIG. 1, with some portions thereof broken away.

FIG. 4 is a view in side elevation also on the scale of FIG. 3, showing three different positions for the support member.

FIG. 5 is a fragmentary enlarged view in perspective of the tension arm and its engagement with the support bar of the device of FIG. 2.

DESCRIPTION OF A PREFERRED EMBODIMENT

FIG. 1 shows a counter top 10 on which rests a mixing bowl 11 with which a strainer 12 is to be used. The strainer 12 is provided with a sieve 13 (see FIGS. 1—3) having a rim 14 from which depends an hemispherical screen 15. Projections 16, 17, and 18 are adapted to rest on a lip 19 of a small utensil, but, in this instance do not reach the rim of the untensil 11 with which the strainer 12 is to be used. The strainer 12 has a handle 20 which is connected to the rim 14 by an intermediate wire portion 21. The handle 20 may be of plastic or wood and may be generally rectangular, or circular, or part-rectangular and part-arcuate. A rectangular handle 20 is shown by way of example.

The invention comprises a support attachment 22 which may incorporate a base strip or bar 23 to which may be secured a pair of clips 24 and 25, shaped appropriately to the shape of the handle 20 and by which the attachment 22 is secured to the strainer 12, as by sliding over the handle 20. The clips 24 and 25 may each comprise a springy sheet metal member, suitably plated, formed into a generally rectangular shape whose ends do not meet but are spaced apart by a gap, so that the clips 24 and 25 can expand or contract to fit some differences in size of handles 20. The base strip 23 may have a flat upper surface 26 for engagement with the lower surface 27 of the handle and may have a flat lower surface 28 (See FIG. 4).

To one end of the base strip 23 is pivotally secured a support rod 30, as by a hinge 31 attached to the lower surface 28 of the base strip 23 (See FIG. 2). The support rod 30 is of a length corresponding roughly to the height of various utensils with which it is used, such as the mixing bowl 11 and has an outer end 32. The support rod 30 is preferably shaped as a channel, and therefore provides a pair of inturned, rounded-edge guideways 33 and 34, as shown in FIG. 5.

To a second hinge 35 elsewhere along the base strip 23 is secured a tension arm 36. The tension arm 36 preferably comprises a wire member shaped to provide a pair of arms 37 and 38 joined to the hinge 35 by a connecting portion 39. At their lower end the wires 37 and 38 are provided with outturned ends 40 and 41 (See FIG. 5). The outturned flanges 40 and 41 at the end of the tension arm 36 can slide, with friction, in the guideways 33 and 34. Once set, they retain the position to which they are set. As can be seen in FIG. 4, the support rod 30 can move to various positions, and while it moves between one position and another, ends 40 and 41 of the tension arm 36 slide along in the channels 33 and 34. The tension arm 36 serves to backup the device 12 and to prevent it from collapsing.

The base strip 23 also supports a pair of slidable metal clips 42 and 43, to act as a latch for the support rod 30 when it is not in use, or, in other words, is in its closed position against the surface 28, as illustrated in FIG. 3 in broken lines, extending below the base strip 23 and parallel to it.

As shown in FIGS. 1 and 3, when the support rod 30 is unlocked, it may be swung out to any of various positions, so that its outer end 32 may engage the counter 10 and help support the strainer 12. Application of the attachment 22 and use are apparent from what has already been explained. In place of this sliding device, a snap-in, snap-out releasable locking clip may be used.

If desired, the support assembly 22 may be permanently secured to the handle 20, with or without the use of a separate strip 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A support attachment for a strainer having a sieve supported by a handle, comprising:
a base member,
means secured to said base member for enabling attachment to a said handle,
a support rod hinged to said base member adjacent one end thereof, said support rod providing a pair of parallel guideways lengthwise therealong,
a tension arm hinged to said base member at a location spaced away from where the support rod is hinged and comprising a pair of springing wire arms with outturned ends frictionally and slidably engaging said support rod guideways, and
locking means secured to said base member for locking said support rod in a closed position against said base member.

2. A support attachment for a strainer having a sieve supported by a handle, comprising:
a base member,
a pair of spaced-apart handle-engaging clips secured to said base member to enable attachment to a said handle,
a support rod hinged to said base member adjacent one end thereof, said support rod having a channel-shape in cross-section with edges turned over to provide lengthwise guideways,
a tension arm hinged to said base member at a location spaced away from where the support rod is hinged and comprising a pair of wire arms with outturned ends frictionally and slidably engaging said support rod guideways, and
a releasable locking clip secured to said base member for locking said support rod in a closed position against said base member.

3. A strainer having a sieve supported by a handle and also comprising:
a support device secured to said handle and including
a pivoted support rod adjacent one end thereof, said support rod having a pair of longitudinal guideways,
a pivoted tension arm, with its pivot spaced away from that of the support rod and comprising a pair of wire arms with outturned ends frictionally and slidably engaging said support rod guideways, and
locking means for locking said support rod in a closed position against said base member.

* * * * *